United States Patent [19]

Speiser

[11] Patent Number: 5,216,714
[45] Date of Patent: Jun. 1, 1993

[54] METHOD AND APPARATUS FOR CONTROLLING THE SPECTRAL CONTENT OF A DATA STREAM

[75] Inventor: Benjamin T. Speiser, Oakland, Calif.
[73] Assignee: 3COM Corporation, Santa Clara, Calif.
[21] Appl. No.: 808,255
[22] Filed: Dec. 13, 1991
[51] Int. Cl.[5] .............................................. H04L 9/00
[52] U.S. Cl. ...................................................... 380/9
[58] Field of Search ........................ 380/9; 375/25, 114

[56] References Cited

U.S. PATENT DOCUMENTS 4,775,985 10/1988 Busby ..................................... 375/25
4,782,488 11/1988 Anderson ................................ 380/9

Primary Examiner—Salvatore Cangialosi
Attorney, Agent, or Firm—Townsend and Townsend Khourie and Crew

[57] ABSTRACT

An FDDI transmitting apparatus employs a scrambler to scramble input NRZ data which in turn is input to an NRZI-to-NRZ pre-encoder. This is in turn coupled in series with an NRZ-to-NRZI encoder to produce scrambled FDDI data for transmission whose spectral content is predistorted to minimize spectral content peaks above about 30 MHz. A complementary receiving apparatus employs an NRZI-to-NRZ decoder which, according to the invention, is coupled to an NRZ-to-NRZI postdecoder. This data is thence coupled to a descrambler according to the invention to recover the original data.

15 Claims, 8 Drawing Sheets

METHOD AND APPARATUS FOR CONTROLLING THE SPECTRAL CONTENT OF A DATA STREAM

BACKGROUND OF THE INVENTION

This invention relates to a method and apparatus for changing the spectral content of a data stream suitable for high-speed local area network communications over wire lines. It is contemplated that serial information is to be transmitted at extremely high data rates over specific media and relatively short distances (up to 100 meters on data grade unshielded twisted pair cabling or level 5 cable, and up to 200 meters on Type 1 shielded cabling). The particular field of application is in communications according to the Fiber Distributed Data Interface (FDDI) standard.

FDDI is a high-speed LAN protocol based on use of a token in a ring topology and originally designed only for fiber optic networks communicating at video data rates. According to the FDDI Physical Media Dependent (PMD) layer protocol, encoding is Non Return to Zero Invert (NRZI) with a 4-bit to 5-bit conversion/translation which guarantees no more than a 14% deviation from a reference d.c. level. Data rates are such that unwanted spurious emissions may be generated which cause electrical interference.

FDDI allows two types of network stations or nodes on an electrically-connected ring. One class, Class A, may couple to a primary and a redundant secondary ring simultaneously. Another class, Class B, may be coupled to only one ring at a time. Class B nodes are intended to use a single connection to carry both incoming and outgoing lines of a ring. However, because of the dual fiber configuration of the primary ring, Class A nodes and Class B nodes can be interconnected only through an interfacing device referred to as a wiring concentrator. The wiring concentrator provides connection points into the primary ring that are suitable for Class B type connections.

The connection between Class B nodes and the wiring concentrator may be optical fiber or copper twisted pair wire, such as IBM Type 1 shielded wire. It would be advantageous to use Data Grade high twist cabling or conventional telephone DIW unshielded twisted pair cabling, particularly in a building structure already wired with such wiring. However, it has been considered difficult, if not impossible, to use such wiring at data rates comparable to the fiber optic speeds of interest. As a consequence, there is a constraint on the rate of data exchange which prevents the use of such wiring in the connection between a Class B node and a data concentrator. It turns out that data rates of 125MB/s can be supported by twisted pair wiring, provided that RF emissions can be reduced to acceptable levels. FCC standards require that emission levels be suppressed in the spectrum of 30 MHz to 1 GHz. Current FDDI modulation schemes cannot meet these constraints on unshielded twisted pair wiring.

Data scramblers are known for the purpose of encrypting data for secure transmission or to provide for error detection and correction in noisy communication channels. Some incidental spectral modification generally results. However, such spectral shaping is generally a side effect which typically results in a degraded spectrum. A primitive scrambling and descrambling technique, NRZ/NRZI encoding, is part of the FDDI specification. The specified scrambling technique aggravates the emissions problem by producing, especially in response to the FDDI "idle" signal, a strong square-wave frequency characteristic with a fundamental frequency of 62.5 MHz and strong odd harmonics. The FDDI "idle" symbol is 11111. In between frames of data, the "idle" signal is transmitted to keep the receive clocks at each "listening" station synchronized to the transmit clocks at each "talking" station. After NRZI encoding, this idle signal becomes 10101—a 62.5 MHz square wave.

What is needed is a scheme for communication of baseband signals on copper wiring which is capable of data rates comparable to that of fiber optic cables while satisfying the stated constraints.

SUMMARY OF THE INVENTION

According to the invention, in an FDDI communication system, an FDDI transmitting apparatus employs a scrambler to preshape spectral content by scrambling input NRZ data. The scrambled NRZ input data in turn is input to an NRZI-to-NRZ pre-encoder which in turn is coupled in series with an FDDI transceiver NRZ-to-NRZI encoder to produce a scrambled form of NRZ encoded FDDI data for transmission whose spectral content is predistorted to redistribute spectral content above about 30 MHz and to minimize spectral content peaks in that range. A complementary receiving apparatus employs an NRZI-to-NRZ decoder. The output is coupled to an NRZ-to-NRZI postdecoder which, according to the invention, produces as output NRZ data whose content must be descrambled. This is coupled to a descrambler according to the invention to recover the original NRZ data. It is a characteristic of the invention that the NRZ and NRZI encoding schemes belong to a class of invertible encoding schemes, such that the NRZI-to-NRZ coding of the pre-encoder and decoder can operate on NRZ-type input data to produce a type of coded output data which the NRZ-to-NRZI coding of the encoder and post-decoder returns to the original NRZ-type data.

A method according to the invention is implemented employing NRZ pre-encoding techniques and postdecoding techniques. This invention is based on the discovery that the application of common scrambling techniques to data producing specific data patterns which normally result in undesired spectral content can reduce undesired RF emissions.

DESCRIPTION OF THE PREFERRED EMBODIMENTS

As mentioned above, NRZI encoding converts the FDDI idle signal into a 62.5 MHz square wave, which produces a great deal of RF emissions. This square wave is used to keep the clocks of the various stations of an FDDI system synchronized, but such a high frequency signal is not truly required. The clock recovery systems of FDDI stations are robust enough to maintain synchronization even with a lower frequency signal. However, the NRZ/NRZI encoder/decoder pair is normally buried within the logic supporting an FDDI transceiver, and cannot by bypassed.

Figure 1:
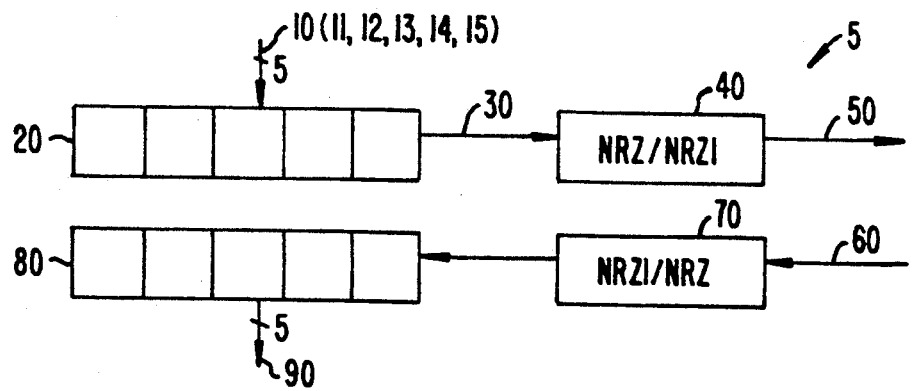
FIG. 1 is a block diagram illustrating a conventional FDDI transmitter and receiver architecture.

A portion of a conventional FDDI transceiving apparatus 5 is illustrated in FIG. 1. This apparatus normally resides in the physical medium dependent level of the FDDI system. Input data stream 10 is composed of FDDI symbols, which are five bits each in parallel. The rate of this data stream is 25 MHz. Input data stream 10, carried on five bit lines 11-15, is coupled to a parallel load shift register 20, which converts the data stream 10 to a 125 MHz serial data stream 30. This serial data stream is then encoded by NRZ-to-NRZI encoder 40 to produce transmit data stream 50. Likewise, 125 MHz receive data stream 60 is decoded by NRZI-to-NRZ decoder 70, the output of which is coupled to serial to parallel shift register 80 to produce a 25 MHz output data stream 90 of 5 bit FDDI symbols. As mentioned earlier, this logic is buried within other logic components of conventional FDDI transceivers and is not easily bypassed.

Figure 2:
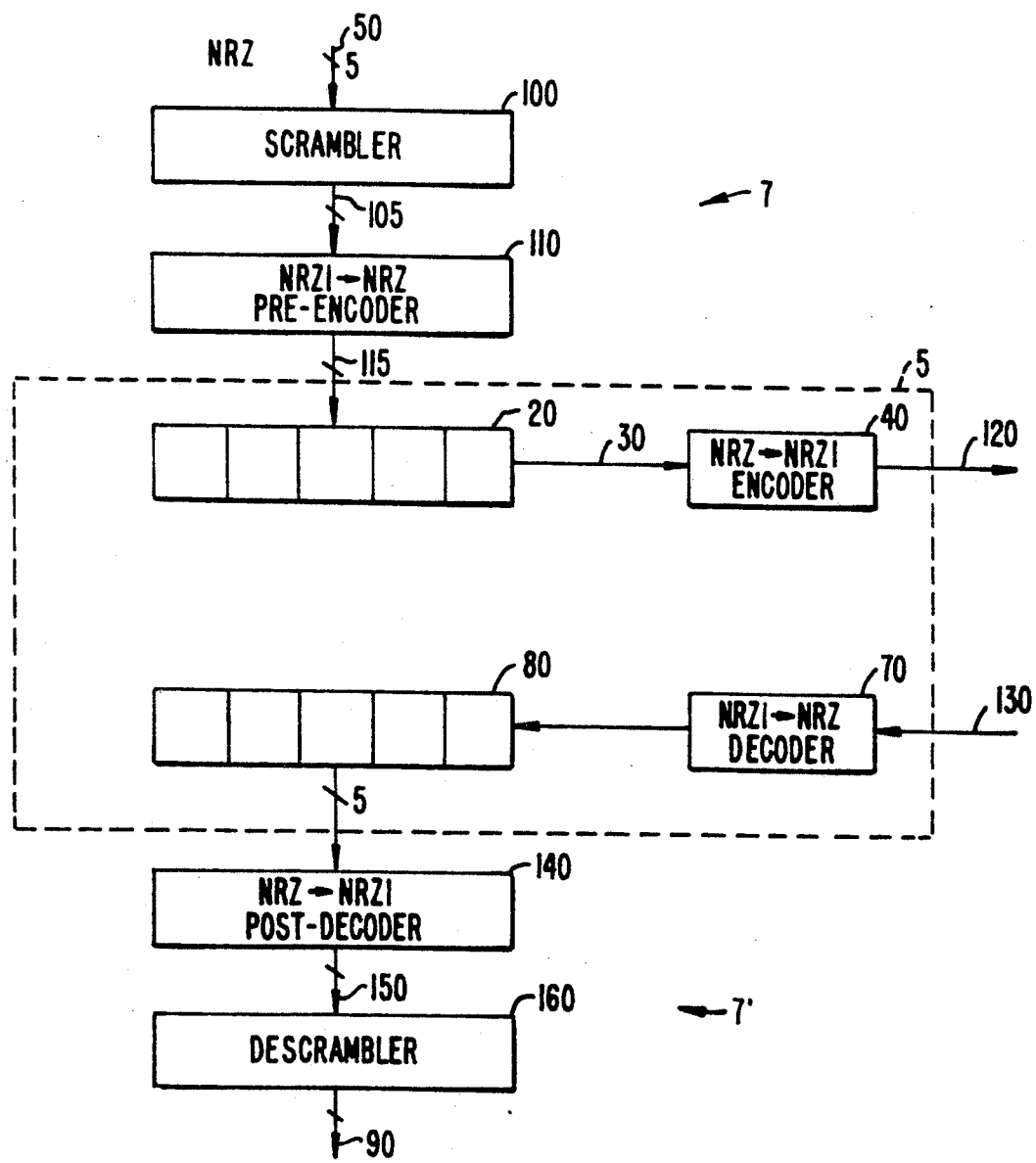
FIG. 2 is a block diagram of a device according to the invention for use in connection with a conventional FDDI-standard transceiving apparatus.

Illustrated in FIG. 2 is a scrambling device 7 according to the invention for use in connection with a conventional FDDI transceiver, such as that of FIG. 1. This scrambling device 7 takes advantage of an unusual property of NRZ-to-NRZI encoding to circumvent the buried encoder/decoder pair 5. NRZ-to-NRZI encoding is defined by the equation $y_i = x_i + y_{i-1}$; NRZI-to-NRZ by $y_i = x_i + x_{i-1}$. (Note: unless indicated otherwise, the '+' symbol represents addition or Boolean XOR, which are equivalent for single digit binary numbers, rather than a Boolean OR.) NRZ-to-NRZI encoding is said to possess memory, because the current output depends upon the previous output value. The consequence of this property is that to uniquely specify the output pattern, the initial value of $y_{i-1}$ must also be specified. In standard practice this initial value is zero. A characteristic common to most encoding schemes possessing memory is that they are non-invertible. For non-invertible encoding, data can be recovered by placing a decoder after an encoder, but not by placing the same decoder before the encoder. It is to be noted that NRZ-to-NRZI encoding is invertible, provided that the initial conditions of the encoder and decoder can be controlled, and this property is used in designing the device of FIG. 2, to allow scrambling of the data stream so as to reshape the spectral distribution and minimize RF emissions and to permit descrambling to recover the data.

In this configuration, NRZ input data in input data stream 10 passes through a scrambler 100, producing scrambled data 105. Scrambled data 105 is processed by an NRZI-to-NRZ pre-encoder 110 before passing through shift register 20 and NRZ-to-NRZI encoder 40 to produce 125 MHz serial transmit data stream 120. Scrambler 100 is of a structure designed to shape the spectral content of the data transmission so as to minimize high frequency components, and therefore minimize RF emissions above 30 MHz. Because of the invertibility of NRZI encoding, pre-encoder 110 and encoder 40 nullify each other, and the transmitted data stream 120 has the spectral content determined by scrambler 100.

At the receiver end of the system, receive data stream 130, which is treated as NRZI data by transceiver apparatus 5, passes through NRZI-to-NRZ decoder 70 and shift register 80 of transceiver apparatus 5, and then NRZ-to-NRZI post-decoder 140 to nullify the effects of decoder 70. Output 150 from post-decoder 140 is thus identical to receive data 130 and also to scrambled data 105, except that it is in 5 bit parallel form. Output 150 is then descrambled by descrambler 160 to produce the desired FDDI output data stream 90.

Any of a multitude of encoding algorithms may be chosen for scrambler 100, depending upon the desired spectral shaping. It is generally preferred that the encoding algorithm have a long memory, so that it may form long sequences of ones and zeros (as opposed to the minimal length sequence of a square wave). One preferred encoding algorithm is described by the function $1 + X^1 + X^{15}$, which corresponds to the equation $y_i = x_i + y_{i-1} + y_{i-15}$. In a like fashion, NRZ-to-NRZI encoding would have an equation of $1 + X^1$. Another preferred encoding algorithm is described by the function $1 + X^{14} + X^{15}$, which corresponds to the equation $y_i = x_i + y_{i-14} + y_{i-15}$. The data produced by a scrambler having the equation $1 + X^{14} + X^{15}$ has a spectral content nearly identical to that of random data. Use of this scrambling scheme decreases undesirable RF emissions above 30 MHz by about 25 dB in comparison to a conventional FDDI transceiver. Other scrambling schemes may be employed with comparable benefits. For instance, the equation $1 + X^1 + X^{15}$ also produces data having a spectral content with high frequency components of far lesser magnitude than data produced by straight NRZI encoding.

Figure 3:
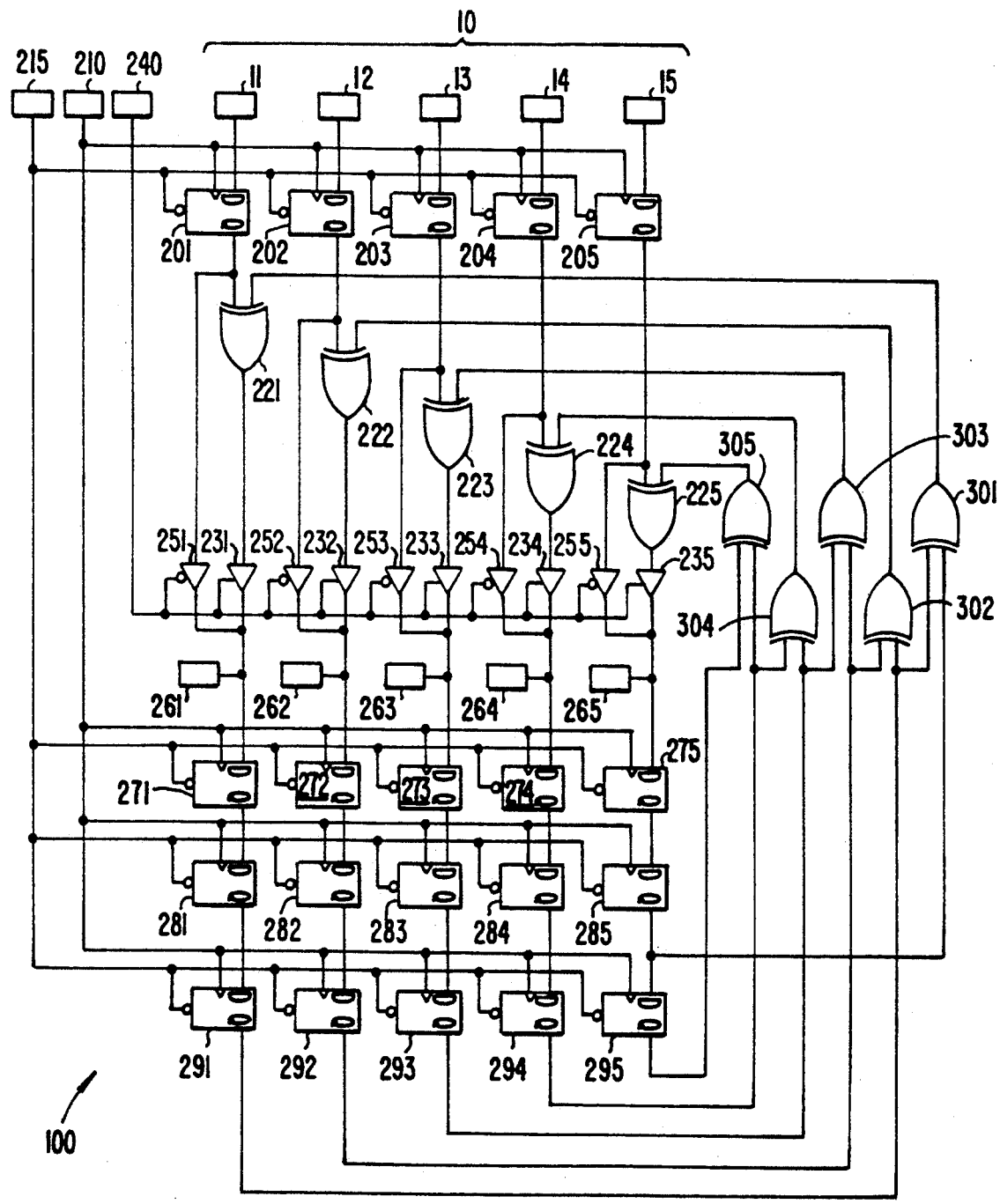
FIG. 3 is a block diagram of one embodiment of a scrambler according to the invention.

Because the scrambler intercepts the data stream at a five bit width portion, it is desirable to perform the scrambler in a five parallel bit pipelined fashion as well. Such a scrambler 100 is illustrated in FIG. 3. The five bit lines 11-15 of input data stream 10 couple to latches 201-205, respectively. These latches are controlled by a clock signal 210 and a reset signal 215; signals 210 and 215 also control all the other latches of the scrambler as well. Reset signal 215 is used to control the initial conditions of the scrambler, as is necessary for an encoder with memory. The outputs from latches 201-205 are respectively coupled to exclusive-or (XOR) gates 221-225, which add in feedback according to the scrambling equation. The outputs of XOR gates 221-225 are then coupled to gated buffers 231-235, which are controlled by scramble enable signal 240. In parallel with each XOR/buffer combination is a respective one of gated buffers 251-255, supplied directly by the outputs of latches 201-205 and controlled by the scramble enable signal 240 inverted. The outputs of gated buffers 231-235 and of 151-155 are coupled to scrambler outputs 261-265, respectively. In effect, each respective pair of gated buffers 231-235 and 251-255 form a two input multiplexor controlled by scramble enable signal 240.

The scrambler outputs 261-265 are also coupled to three layers of latches (271-275, 281-285, and 291-295) to provide the delayed terms necessary for the scrambling equation. The delayed term sums $y_{i-14} + y_{i-15}$ for each input 11-15 are computed by two-input XOR gates 301-305, respectively, the outputs of which are the feedback input to XORs 221-225. Recall that the data is transmitted in a single bit data stream, with line 15 transmitted first and line 11 transmitted last. So, line 15 has the $i-1$ position with respect to line 14, the $i-2$ position with respect to line 13, etc. Each of the three rows of latches therefore adds an equivalent delay of 5. For input 11, therefore, the $y_{i-14}$ ($X^{14}$) term is the output from latch 285, and the $y_{i-15}$ ($X^{15}$) term is the output from latch 291. For inputs 12-15 the $y_{i-14}$ and $y_{i-15}$ are the outputs from latches 291, 292; 292, 293; 293, 294; and 294, 295, respectively. This completes the feedback loop necessary to the scrambler equation. It should be noted that the scrambler outputs, which are illustrated as tapping in immediately before latches 271-275, may instead tap in before or after any of the three latch rows 271-275, 281-285, or 291-295. The only resulting difference is the magnitude of the delay time between the application of input data to lines 11-15 before the appearance of corresponding output data on lines 261-265.

Figure 4:
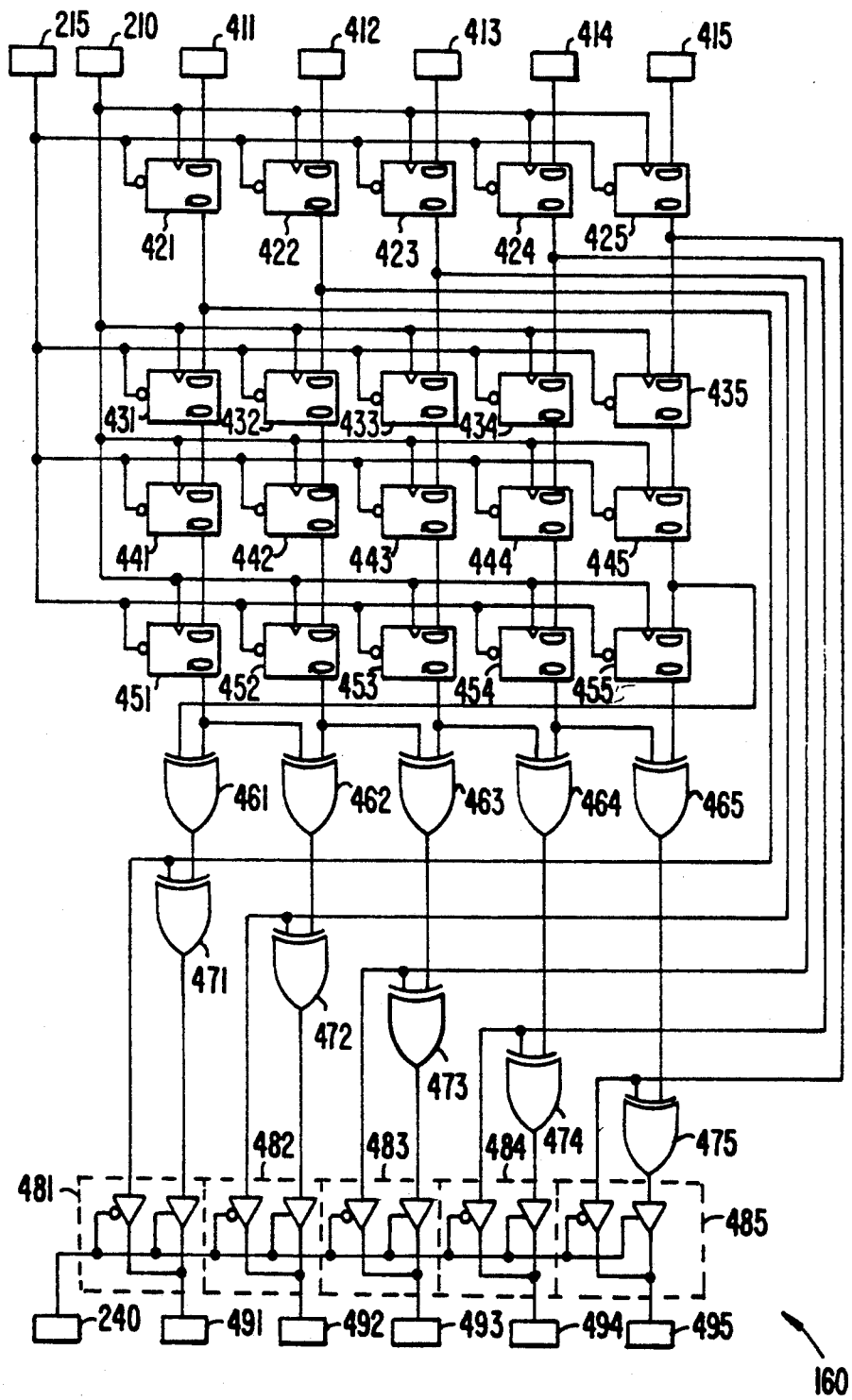
FIG. 4 is a block diagram of one embodiment of a descrambler according to the invention.

Illustrated in FIG. 4 is a descrambler 160 corresponding and complimentary to the $y_i = x_i + y_{i-14} + y_{i-15}$ scrambler and implementing the equation $y_i = x_i + x_{i-14} + x_{i-15}$. The designs of the scrambler and descrambler are very similar. All the latches of the descrambler are controlled by clock signal 210 and reset signal 215. Inputs 411-415 couple to latches 421-425. The outputs of latches 421-425 are then coupled to three rows of delay latches 431-435; 441-445; and 451-455. The output of each latch 451-455 provides an $x_{i-15}$ input term to a respective one of XORs 461-465. Each of these XORs 461-465 is also provided an $x_{i-14}$ input term from latches 445 and 451''454, respectively. The final non-descrambled out put is created by XORs 471-475, which receive as inputs the outputs of XORs 461-465 and of latches 421-425, respectively. The outputs of XORs 471-475 are provided to multiplexors 481-485 along with the outputs of latches 421-425. Multiplexors 481-485 are controlled by scramble enable signal 240, and their outputs 491-495 selectably provide either unchanged input data or descrambled input data.

Figure 5:
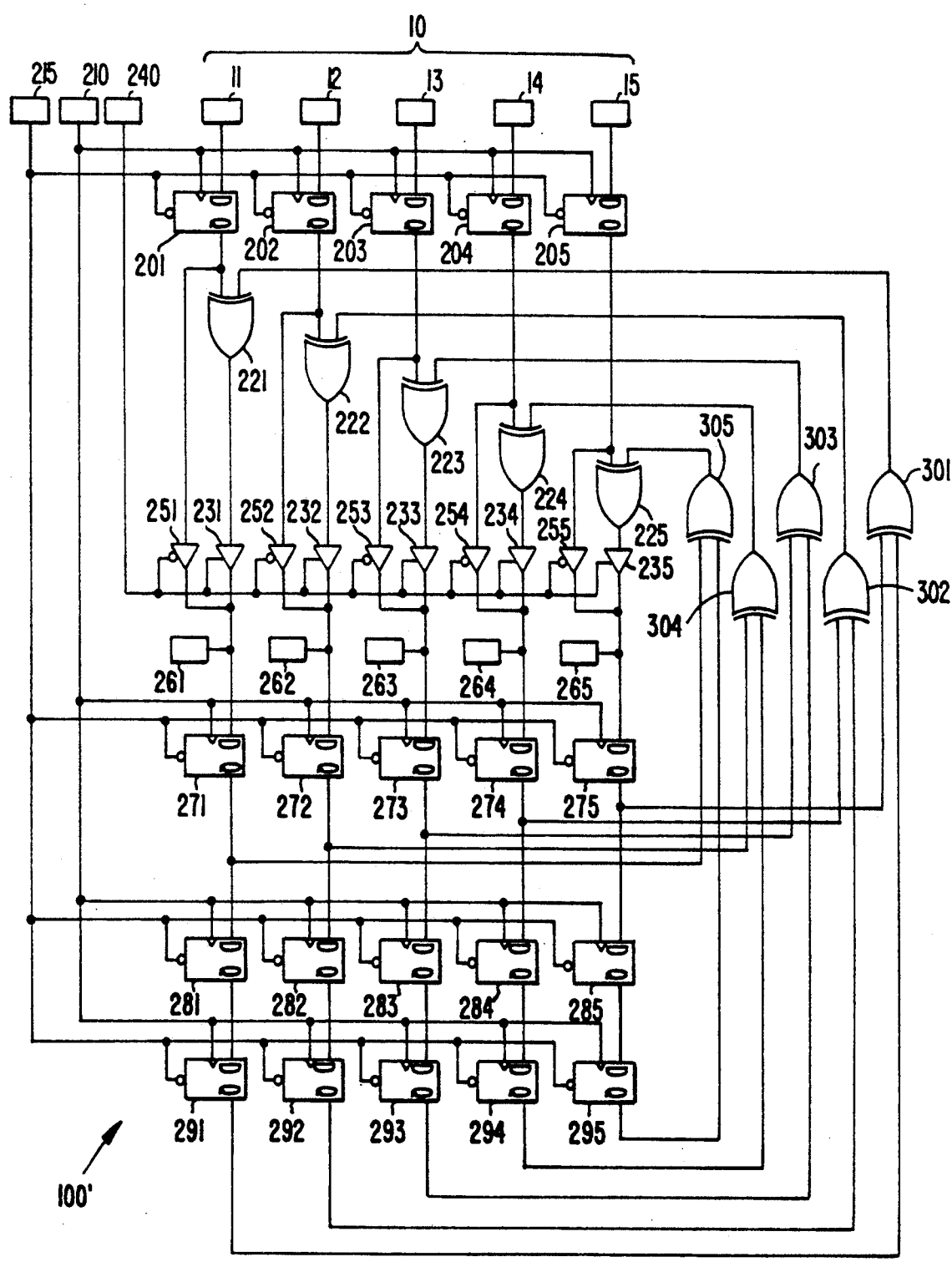
FIG. 5 is a block diagram of a second embodiment of a scrambler according to the invention.
Figure 6:
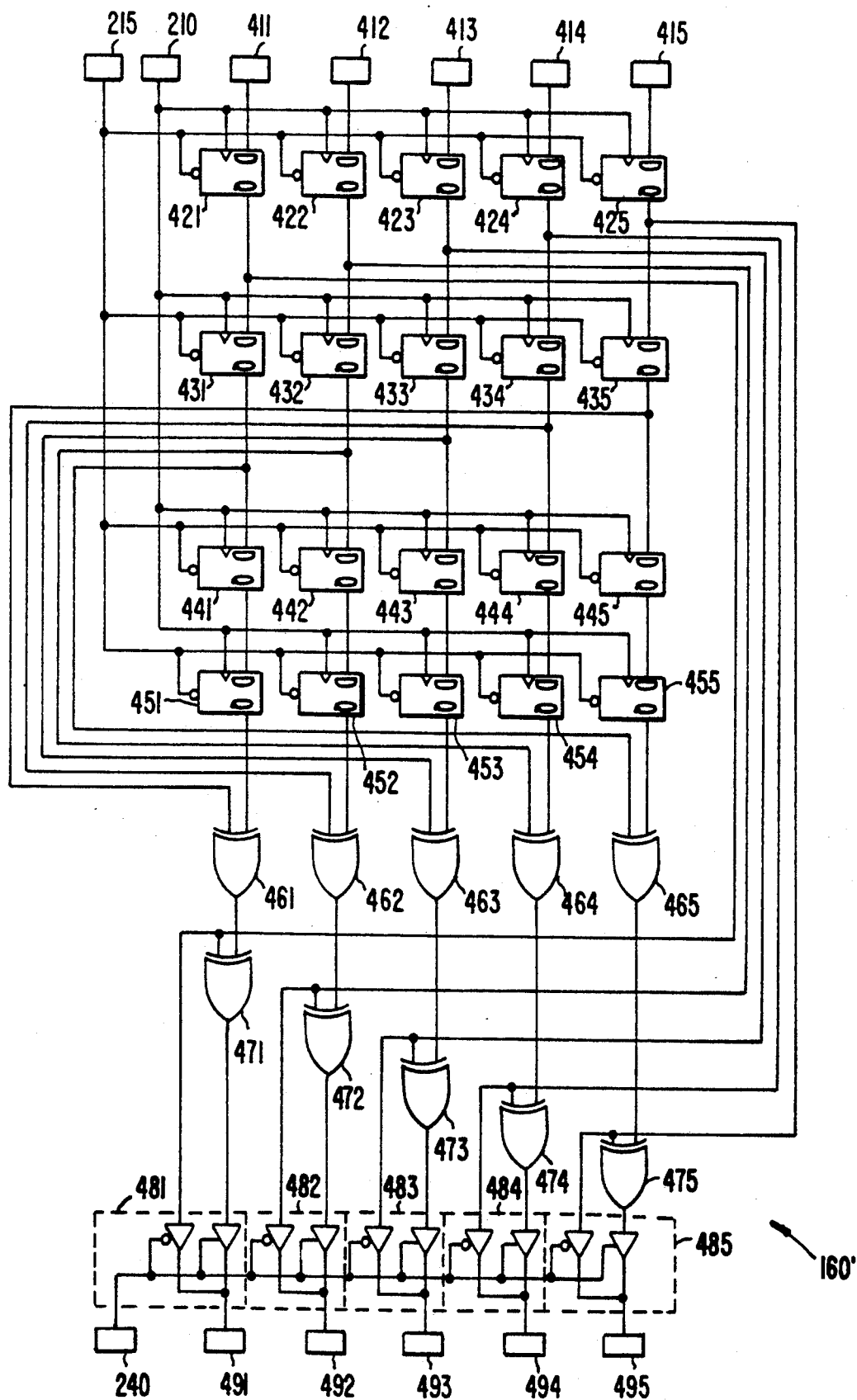
FIG. 6 is a block diagram of a second embodiment of a descrambler according to the invention.

An alternative scrambler 100' and descrambler 160' for the function $1+X^1+X^{15}$, are illustrated in FIGS. 5 and 6. In FIG. 5 it is seen that the $1+X^1+X^{15}$ scrambler 100' is nearly identical to the $1+X^{14}+X^{15}$ scrambler 100. In the latter extra XORs 301-305 combine the $X^{14}$ and $X^{15}$ terms before feeding back into XORs 221-225, whereas in the former XORs 301-305 combine the $X^1$ and $X^{15}$ terms for feedback into XORs 221-225. Likewise, the descrambler 160' of FIG. 6 differs from the descrambler 160 of FIG. 4 only in that the former lacks XOR gates 461-465 that combine the $x_{i-15}$ terms with the $x_{i-14}$ terms.

Figure 7:
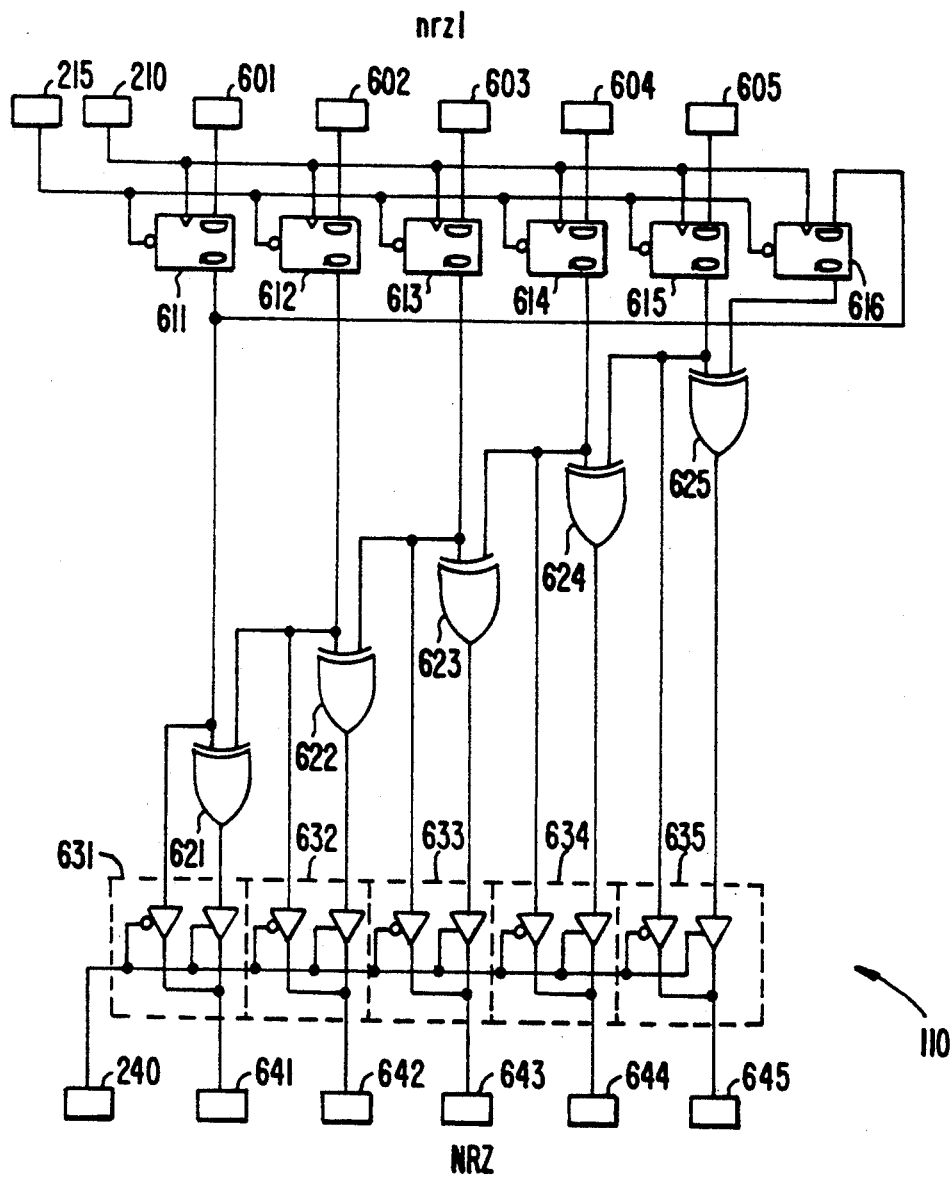
FIG. 7 is a schematic diagram of an NRZI-to-NRZ pre-encoder according to the invention.

For the same reasons it is desirable to scramble and descramble the data in a pipelined fashion, it is also desirable to pre-encode and postdecode the data in a pipelined fashion. A pipelined pre-encoder is illustrated in FIG. 7. This pre-encoder implements NRZI-to-NRZ coding (conventionally used as a decoding operation), which has the equation $y_i = x_i + x_{i-1}$. As with the scrambler and descrambler, all latches are controlled by clock signal 210 and reset signal 215. Inputs 601-605 are provided to latches 611-615. Another latch, 616, is provided as input the output of latch 611, to provide an $x_{i-1}$ term relative to latch 615. The outputs of latches 611-615 are input to two input XOR gates 621-625. The other inputs to XORs 621-625 are the outputs of latches 612-616, respectively. XORs 621-625 output NRZI-to-NRZ coded data which is input to two input multiplexors 631-635, controlled by scramble enable signal 240, to provide outputs 641-645. The use of scramble enable signal 240 here presumes that pre-encoding is only to be done in conjunction with scrambling, but this might not be desirable in a single chip implentation of scrambling-/descrambling and pre-encoding/postdecoding. In such an implementation separate controll would allow use of different scrambling/descrambling algorithms outside the chip, with the on-chip scrambling/descrambling disabled but pre-encoding/postdecoding enabled.

Figure 8:
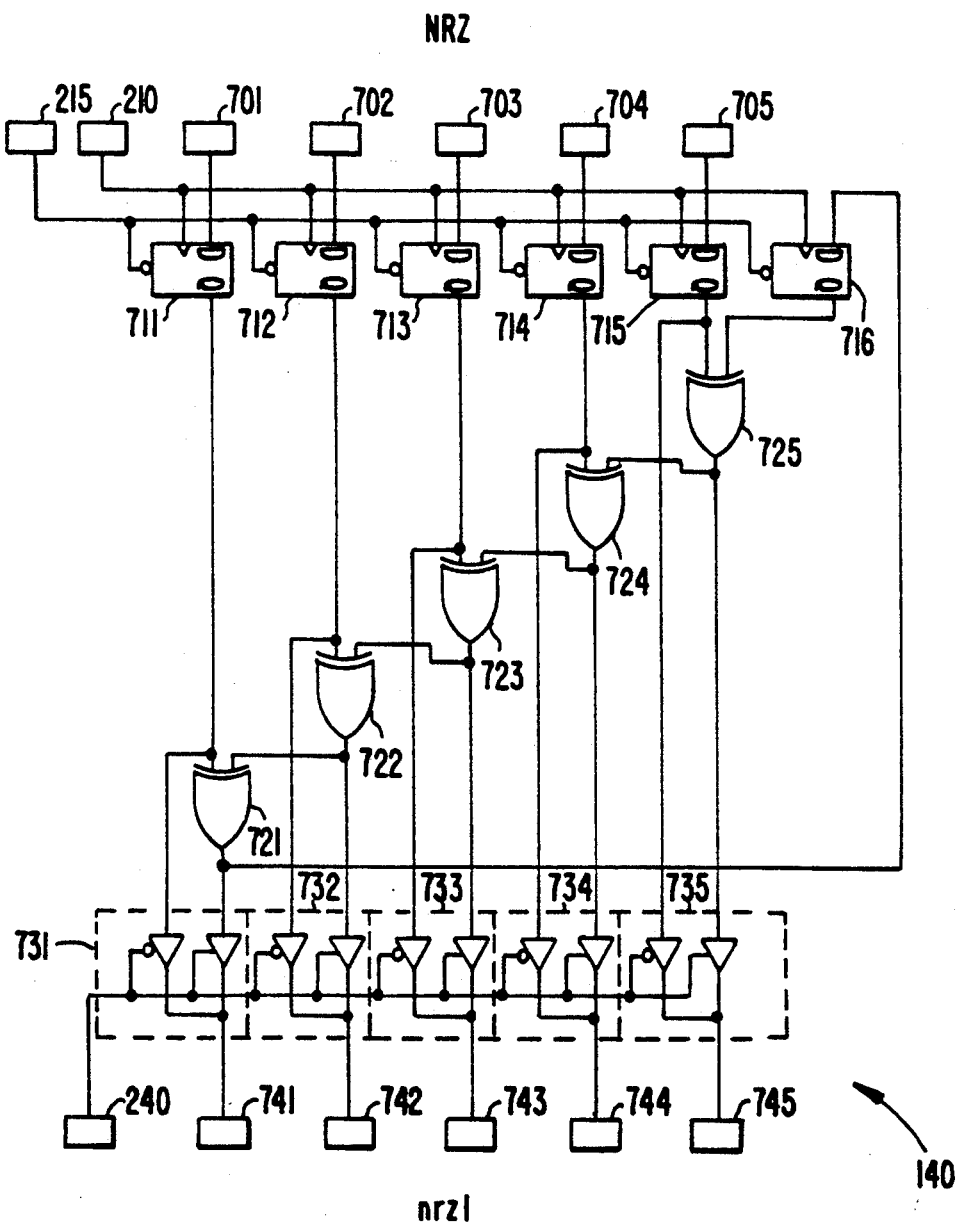
FIG. 8 is a schematic diagram of an NRZ-to-NRZI postdecoder according to the invention.

A pipelined NRZ-to-NRZI postdecoder, implementing $y_i = x_i + y_{i-1}$, is illustrated in FIG. 8. Again, all latches are con-trolled by clock signal 210 and reset signal 215. Inputs 701-705 are coupled to latches 711-715. Latch 716 receives as input the decoded output for line 701, to provide the $y_{i-1}$ term for line 705. The outputs of latches 711-715 are input to two input XOR gates 721-725. The other inputs to XORs 721-725 are the outputs of latches 712-716, respectively. XORs 721-725 output NRZ-to-NRZI coded data which is input to two input multiplexors 731-735, controlled by scramble enable signal 240, to provide outputs 741-745.

Figure 9:
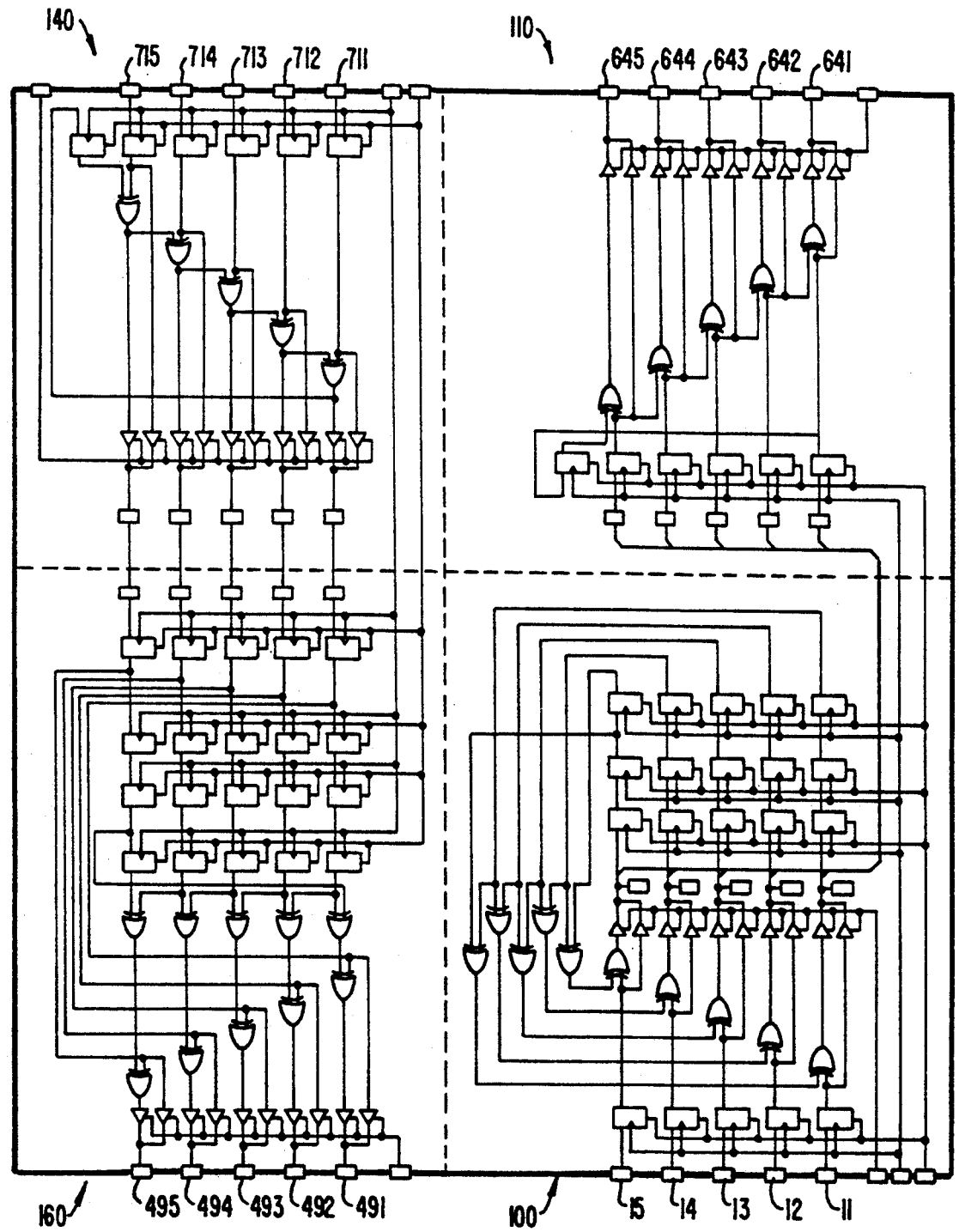
FIG. 9 is a schematic diagram of a chip including a scrambler, pre-encoder, postdecoder, and descrambler.

Scrambler 100, pre-encoder 110, postdecoder 140, and descrambler 160 lend themselves to being placed on a single chip, as illustrated in FIG. 9. Here, scrambler 100 is shown coupled in series with pre-encoder 110, and postdecoder 140 is coupled in series with descrambler 160. This chip may then be connected to the apparatus of FIG. 1 to create the spectral shaping FDDI transceiver apparatus of FIG. 2.

This invention represents a significant improvement in spectral characteristics over a comparable non-scrambled, non-pre-encoded signal, and it permits the transmission of information with a higher signal-to-noise ratio than standard NRZI encoding without violating FCC emission standards. Additionally, pre-encoding provides direct interfacing to FDDI chipsets. The invention has now been explained with reference to specific embodiments. Other embodiments will be apparent to those of ordinary skill in the art familiar with this disclosure. For instance, the present invention has been described with reference to a scrambler having a memory of 15 bits, but if it is determined that a scrambler having a shorter or longer memory is desired, or a different scrambling equation having the same memory length, the pipelined scrambling/encoding and other teachings of the present invention can be directly and straightforwardly applied to such. It is therefore not intended that this invention be limited except as indicated by the appended claims.

What is claimed is:

1. For a transceiver receiving electronic signals representative of input data and providing electronic signals representative of output data, wherein said transceiver encodes input data before transmission and decodes received data to provide output data, and wherein said encoding and decoding allow for pre-encoding and postdecoding such that first source data subjected to said pre-encoding is restored by said encoding, and second source data subjected to said decoding is restored by said postdecoding, an apparatus for modifying spectral content of said source data comprising:

means for scrambling source data into scrambled data constrained within a preselected spectral envelope;

means coupled to said scrambling means for performing said pre-encoding on said scrambled data in order to obtain which is NRZ-to-NRZI code conversion, said means for providing said pre-encoded data as input data to said transceiver;

means, for receiving said output data from said transceiver, for performing said postdecoding on said output data in order to obtain postdecoded data which is NRZ-to-NRZI code conversion; and means coupled to receive said postdecoded data for descrambling said postdecoded data complementary to said scrambling means.

2. The apparatus according to claim 1 wherein said pre-encoding means and said decoding means perform the same code converting process and wherein said encoding means and said postdecoding means perform the same code converting process.

3. The apparatus according to claim 1 wherein said scrambling means and said pre-encoding means are selectable for two modes of operation, a first scrambling mode and second non-scrambling mode in which data is passed through unchanged.

4. The apparatus according to claim 1 wherein said descrambling means and said postdecoding means are selectable for two modes of operation, a first scrambling mode and second non-scrambling mode in which data is passed through unchanged.

5. The apparatus according to claim 1 wherein said scrambling means scrambles said source data through a parallel pipeline five bits wide.

6. The apparatus according to claim 1 wherein said encoding means has a first clock frequency, and wherein said scrambling means and said pre-encoding means have a second clock frequency, said first clock frequency being five times as great as said second clock frequency.

7. In an encoding and decoding scheme wherein the encoding scheme processing electronic signals representative of source data by decoding before being encoded without loss of encodability, an apparatus for modifying spectral content of said source data comprising:

means for scrambling said source data into scrambled data which is constrained within a preselected spectral envelope;

means coupled to said scrambling means for pre-encoding said scrambled data using a code converting process in order to obtain pre-encoded data;

means coupled to receive a representation of said pre-encoded data for encoding said pre-encoded data as encoded data for transmission through a communication medium;

means coupled to receive a representation of said encoded data through said communication medium for decoding said encoded data complementary to said encoding means as decoded data;

means coupled to receive a representation of said decoded data for postdecoding said decoded data complementary to said pre-encoding means as postdecoded data by using a NRZ-to-NRZI code converting process; and means coupled to receive said postdecoded data for descrambling said postdecoded data complementary to said scrambling means to obtain a representation of said source data.

8. The apparatus according to claim 7 wherein said pre-encoding means and said decoding means perform the same code converting process.

9. The apparatus according to claim 8 wherein said encoding means and said postdecoding means perform the same code converting process.

10. The apparatus according to claim 8 wherein a parallel to serial converter means is coupled between said pre-encoding means and said encoding means.

11. The apparatus according to claim 8 wherein a serial to parallel converter means is coupled between said decoding means and said postdecoding means.

12. The apparatus according to claim 7 wherein said encoding means has a first clock frequency, and wherein said scrambling means and said pre-encoding means have a second clock frequency, said first clock frequency being five times as great as said second clock frequency.

13. A method for modifying spectral content of electronic signals representative of source data for a transceiver transmitting and receiving data, wherein said transceiver encodes input data before transmission and decodes received data to provide output data, and wherein said encoding and decoding allow for pre-encoding and postdecoding such that first source data subjected to said pre-encoding is restored by said encoding, and second source data subjected to said decoding is restored by said postdecoding, said method comprising the steps of:

scrambling said source data into scrambled data constrained within a preselected spectral envelope;

performing said pre-encoding on said scrambled data in order to obtain pre-encoded data which is NRZ-to-NRZI code conversion;

performing said encoding on said pre-encoded data to obtain transmit data constrained within said preselected spectral envelope;

transmitting said transmit data;

receiving receive data;

performing said decoding on said receive data in order to obtain decoded data;

performing said postdecoding on said decoded data in order to obtain postdecoded data; and descrambling said postdecoded data which is NRZ-to-NRZI code conversion complementary to said scrambling.

14. The method according to claim 13 wherein said pre-encoding step and said decoding step perform the same code converting process, and wherein said encoding step and said postdecoding step perform the same code converting process.

15. The method according to claim 13 wherein said scrambling step comprises scrambling said source data through a parallel pipeline five bits wide.

* * * * *